(12) United States Patent
Salgado

(10) Patent No.: US 7,649,643 B2
(45) Date of Patent: Jan. 19, 2010

(54) METHOD AND DEVICE FOR INTERMIXING HARDCOPY PAGES IN A PRINT JOB

(75) Inventor: David Salgado, Victor, NY (US)

(73) Assignee: Xerox Corporation, Norwalk, CT (US)

( * ) Notice: Subject to any disclaimer, the term of this patent is extended or adjusted under 35 U.S.C. 154(b) by 960 days.

(21) Appl. No.: 11/190,705

(22) Filed: Jul. 26, 2005

(65) Prior Publication Data

US 2007/0024872 A1 Feb. 1, 2007

(51) Int. Cl.
*G06F 15/00* (2006.01)
*G06K 1/00* (2006.01)

(52) U.S. Cl. .................. 358/1.15; 358/1.16; 358/1.17; 358/1.18; 358/1.9

(58) Field of Classification Search ....... 358/1.12–1.18, 358/1.9
See application file for complete search history.

(56) References Cited

U.S. PATENT DOCUMENTS

| | | | |
|---|---|---|---|
| 5,579,087 A | 11/1996 | Salgado | |
| 6,151,131 A | 11/2000 | Pepin et al. | |
| 7,184,169 B2 * | 2/2007 | Kropf et al. | 358/1.18 |
| 2002/0063896 A1 | 5/2002 | Rogalski, Jr. et al. | |

* cited by examiner

*Primary Examiner*—Edward L Coles
*Assistant Examiner*—Satwant K Singh
(74) *Attorney, Agent, or Firm*—Maginot, Moore & Beck

(57) ABSTRACT

A document generation system includes a printing system and a computer. The printing system includes a print engine, a scanner, a controller and a user interface. The computer is remotely located from but coupled to the printing system. The computer includes software for generating an electronic document and software for designating an insertion point in the electronic document wherein a scanned image of a hardcopy document is to be inserted prior to generating a finished document including the electronic document and an image of the scanned hardcopy document. The controller includes software for identifying the insertion point and for holding the electronic document until the hardcopy document is scanned before generating the finished document including the electronic document and the image of the scanned hardcopy document. A method for intermixing hardcopy pages in a print job utilizes insertion points inserted into an electronic document to identify the location at which scanned images of hardcopy documents are to be inserted in a finished document.

6 Claims, 15 Drawing Sheets

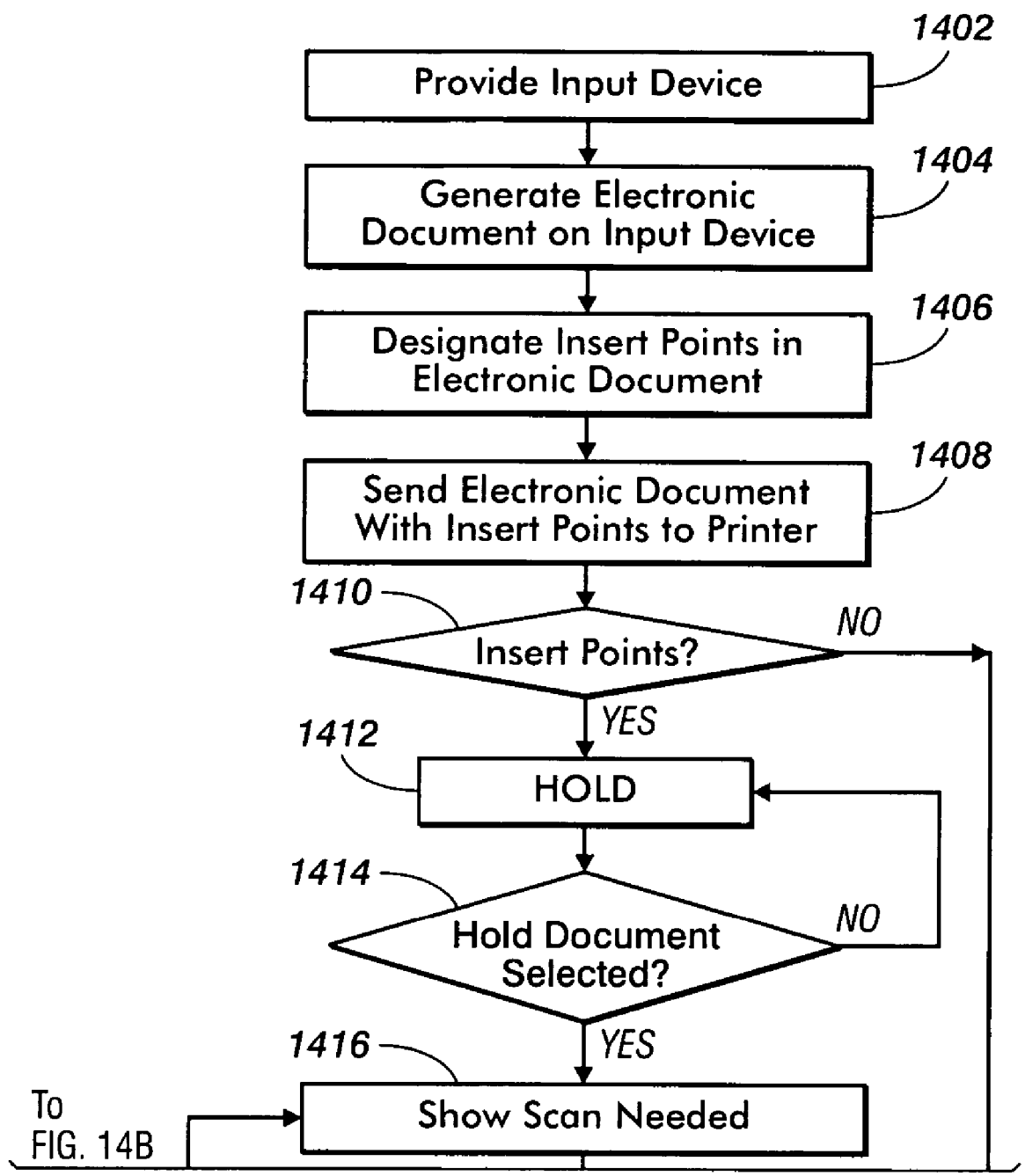

METHOD AND DEVICE FOR INTERMIXING HARDCOPY PAGES IN A PRINT JOB

BACKGROUND AND SUMMARY

This disclosure relates to document preparation and more particularly to utilizing multifunction devices to generate an output wherein scanned images of hardcopy documents are seamlessly integrated into electronic documents at selected insertion points.

Electronic printing systems typically include an input section with an image capture subsystem, a controller, sometimes referred to as an electronic subsystem and an output section or print engine. In several types of electronic printing systems, e.g. the Nuvera® 100/120 digital printing system, DocuTech® 65/75/90/135/6100/6115/6135/6155/6180 printing systems, DocuPrint® 100/115/135/155/180 EPS printing systems, DocuPrint® 65/75/90 printing systems and DocuColor® 2045/2060/6060/iGen3 printing systems manufactured by Xerox Corporation, a job can be input to the input section from, among other sources, a network or scanner.

When a scanner is employed to generate the job, image bearing documents are scanned so that the images therein are converted to image data for use in making prints or incorporation into an electronic document. When a network is used to generate the job, a stream of data, including various job related instructions and image data, expressed in terms of a page description language is captured, decomposed and stored for printing or other output. As is known, a network job can have its origin in a remote client, such a work station or PC, or a print server with a storage device. Jobs provided at the input section may be stored in a memory section, such as a disk drive.

Electronic printing systems, such as the Nuvera®, DocuTech®, DocuPrint® and DocuColor® electronic printing systems, are typically full featured, and various ones of the features provide one or more functions to be performed on the job. Such electronic printing systems are high volume printers that create images electronically. These versatile, high performance printing systems enable personal computers and other network-connected devices (such as workstations and graphic scanners) to produce documents incorporating graphics, forms, logos, signatures, and fonts for printing or other output. Such a printing system is often referred to as a multi-function device ("MFD") and may utilize the scanner and print engine along with network and telephone connections to act as a copier, printer, facsimile machine and digital scanner. For example, a job captured at the input image section for storage may undergo a significant amount of image processing allowing for the minimization of image related artifacts and various electronic pages may be edited after the job has been suitably stored. Pursuant to outputting the stored job, a host of finishing operations, such as stapling, folding, and trimming may be performed on the hardcopy version of the job to optimize its appearance or the finished electronic document may be converted to an appropriate format for electronic transmission as a facsimile or for storage.

In view of the complexity of a given job, it may be desirable to "build" a job on a segment-by-segment basis. Often various parts of a job are merged through use of a job supplement mode. Through this mode, the job supplement function is used to append content to a job as it is being scanned into the printing system. That is, when the job supplement mode is engaged, any number of additional documents or groups of documents maybe scanned in with the job currently being scanned. Upon supplementing the job at the scanner, an END JOB icon is selected, and the supplemented job is stored in a memory section of the printing system.

Often a multi-segment print job is constructed from multiple local and remote sources on a network using a network interface to identify print job segments and locations of segments on the network. This is accomplished by entering a start build print job function at the network interface, identifying each segment of the print job including segment location, specifying print job characteristics such as quantity and quality for each segment, entering an end build print job function at the network interface, and identifying a printing device on the network, whereby each segment of the print job is accessed and distributed to the printing device to complete the multi-segment print job.

It will be further noted that completion of a job may, under certain circumstances be best delayed until a selected event occurs. A triggering event may constitute the provision of a resource that was not available at a previous time during which a subject job was being developed. A job is developed to an extent possible and then set aside in anticipation of a triggering event that is expected to occur at a future time. When the triggering event occurs, development of the job is completed and the job is stored in a memory section.

Under certain circumstances, however, the developer of a job may wish to complete a job well after a significant portion of the job has already been captured or structured electronically through a document generation program such as a word processing program. For example, the developer may, subsequent to the capture/structure phase, wish to process a portion of the job and/or supplement the job with additional images. Pepin et al., U.S. Pat. No. 6,151,131 discloses job development method for use in a document processing system with a subsystem for generating electronic representations of respective images from a set of image data in accordance with a set of control instructions. The set of control instructions includes a first subset of control instructions for controlling the development of a first image, a second subset of control instructions for controlling the development of a second image and a subset of image placemarking instructions. The approach allows a print job to be captured/structured and then supplemented with placeholding instructions, which placeholding instructions are used to complete development of the job at a time subsequent to the capture/structure phase.

The disclosed apparatus and method is particularly suited for use in a network environment, such as in the context of a Local Area Network ("LAN"), the world wide web, the internet or the like.

Often an author of a document wishes to incorporate images of hardcopy material into a finished document including electronically created text and images. In the past, the images of the hard copy material either had to be converted to electronic files and inserted into the electronic document at the desired location prior to electronically transferring the electronic document to a print device for printing or to another electronic transfer device such as a facsimile machine or had to be inserted through preprinted insert pages by a printer including an inserter finisher.

To get the desired output using the preprinted insert option, the user would have to specify in the print job to use 'preprinted' paper from specific trays. The user would need to produce enough copies of each image and load them in the respective trays. The user would then have to make sure no one else tried to print using these trays until the print job was completed. Alternatively, the user could modify the electronic document prior to its submission. The user would need to scan in each image and send it to the computer on which the document is being created and then manually merge or import it into the electronic document. Besides being time consuming, this importation approach limits reusing the original document if the inserted image is to be varied for different copies of the finished document. (e.g. photo of Ted for Ted's copy, a photo of Bob for Bob's copy).

According to one aspect of the disclosure a method of creating a finished document including an electronic document with images of a hardcopy document with a printing system including a print engine and a scanner is disclosed. The method includes creating the electronic document, identifying an insertion point in the electronic document wherein an image of the hardcopy document is to be placed in the finished document, sending the electronic document with the insertion point to a printing system, scanning the hardcopy document with the scanner of the printing system to create the image of the hardcopy document after the electronic document with the insertion point has been sent to the printing system, inserting the image in the electronic document at the insertion point to generate the finished document and outputting the finished document.

According to another aspect of the disclosure a document generation system includes a printing system and a computer. The printing system includes a print engine, a scanner, a controller and a user interface. The computer is remotely located from but coupled to the printing system. The computer includes software for generating an electronic document and software for designating an insertion point in the electronic document wherein a scanned image of a hardcopy document is to be inserted prior to generating a finished document including the electronic document and an image of the scanned hardcopy document. The controller includes software for identifying the insertion point and for holding the electronic document until the hardcopy document is scanned before generating the finished document including the electronic document and the image of the scanned hardcopy document.

According to yet another aspect of the disclosure, a document printing system for electrostatograhically printing a finished document comprises a printing system and a computer. The printing system includes an electrostatographic print engine, a scanner, a controller and a user interface. The computer is remotely located from but coupled to the printing system. The computer includes software for generating an electronic document and software for designating an insertion point in the electronic document wherein a scanned image of a hardcopy document is to be inserted prior to generating a finished document including the electronic document and an image of the scanned hardcopy document inserted at the insertion point. The controller includes software for identifying the insertion point and for holding the electronic document until the hardcopy document is scanned before electrostatographically printing the finished document including the electronic document and the image of the scanned hardcopy document inserted at the insertion point.

Additional features and advantages of the presently disclosed method and device for intermixing hardcopy images in a print job will become apparent to those skilled in the art upon consideration of the following detailed description of embodiments exemplifying the best mode of carrying out the disclosed method and apparatus as presently perceived.

BRIEF DESCRIPTION OF THE DRAWINGS

A more complete understanding of the disclosed apparatus can be obtained by reference to the accompanying drawings wherein.

Corresponding reference characters indicate corresponding parts throughout the several views. Like reference characters tend to indicate like parts throughout the several views.

DETAILED DESCRIPTION

Figure 1:
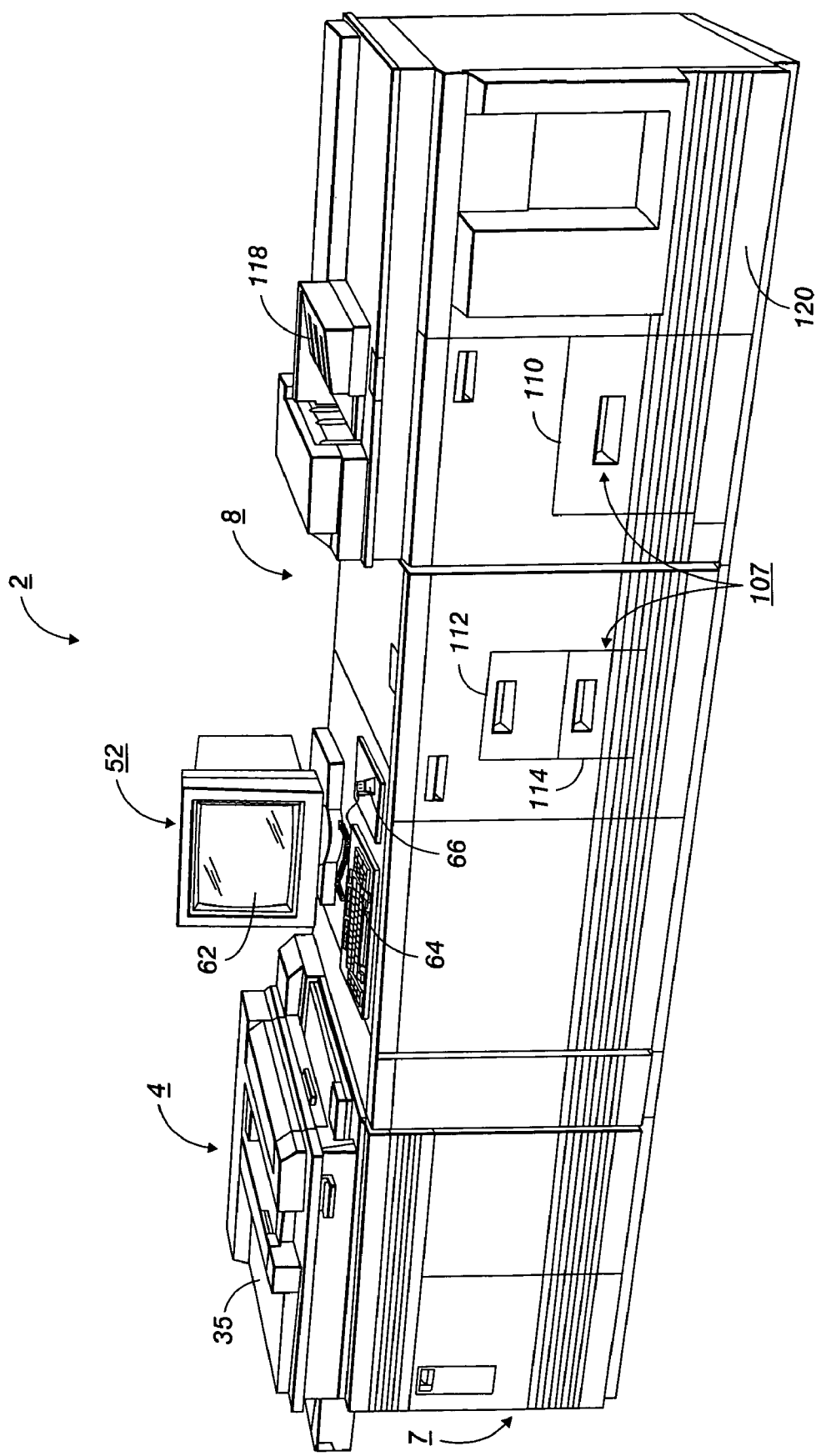
FIG. 1 is a perspective view depicting an electronic printer of the type suitable for use with the disclosed method and apparatus.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art to which this disclosure pertains.

Figure 2:
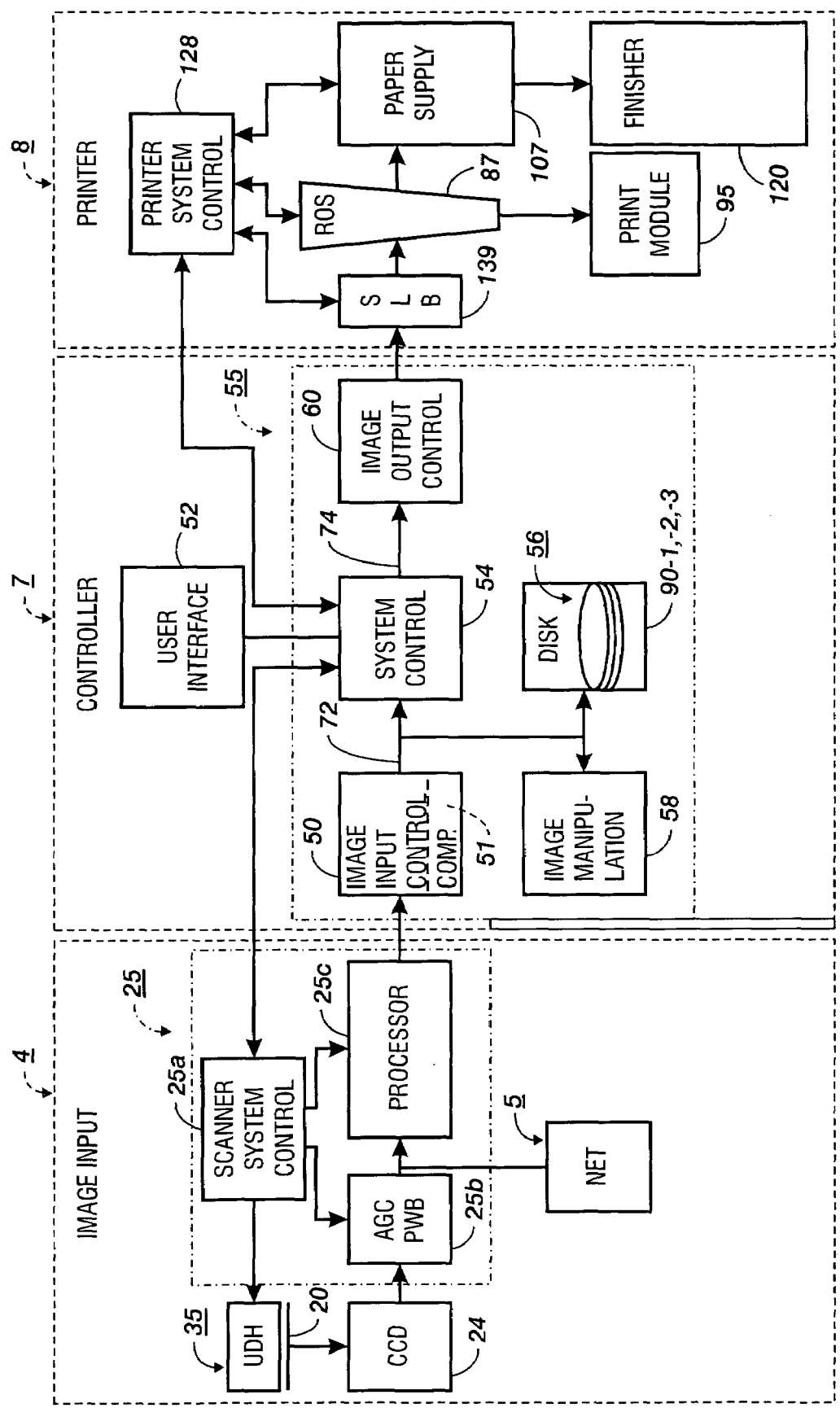
FIG. 2 is a block diagram depicting the major elements of the printer shown in FIG. 1.

Referring to FIGS. 1 and 2, there is shown an exemplary an MFD image printing system 2 for processing print jobs wherein an image of a hardcopy document is to be scanned at the time of outputting or generating of a finished document in accordance with the teachings of the present disclosure. Printing system 2, for purposes of explanation, is divided into image input section 4, controller section 7, and printer section 8. In the example shown, the image input section 4 has both remote and on-site image inputs, enabling system 2 to provide network, facsimile, scan, and print services. Other system combinations may be envisioned such as a stand alone printing system with on-site image input (i.e., a scanner), controller, facsimile machine and printer; a network printing system with remote input, controller, facsimile machine and printer; etc.

While a specific printing system is shown and described, the disclosed device and method may be used with other types of printing systems. For example, printer section 8 may instead use a different printer type such as ink jet, ionographic, thermal, photographic, etc., and, furthermore, may be employed in conjunction with electronic display systems, such as CRTs, LCDs, LEDs, etc. or else other image scanning/processing/recording systems, or else other signal transmitting/receiving, recording systems, etc. as well.

As shown, for example, in FIG. 2, for off-site image input, image input section 4 has a network 5 with a suitable communication channel such as an EtherNet® connection enabling image data in the form of image signals or pixels from one or more remote sources to be input to system 2 for processing. Where the Page Description Language (PDL) of the incoming imaging data is different than the PDL used by system 2, suitable conversion means (not shown) are provided. Other remote sources of image data such as streaming tape, floppy disk, video camera, etc. may be envisioned.

For on-site image input, section 4 has a document scanner section 6 with a Universal Document Handler (UDH) 35 for the purpose of automatically and sequentially placing and locating sets of multiple documents for scanning. Scanner section 6 incorporates one or more linear light sensitive arrays 24 for reciprocating scanning movement below platen 20 and focused on a line-like segment of platen 20 and the document being scanned thereon. Array 24, which may utilize Charge-Coupled Device (CCD) technology or the like, provides image elemental signals or pixels representative of the image scanned which are input to processor 25 for processing.

Processor 25 communicates with the controller section 7 and includes a scanner system control 25a, an automatic gain control printing wiring board (AGCPWB) 25b, and a processor 25c. AGCPWB 25b converts the analog image signals output by array 24 to digitally represented facsimile signals and processor 25c processes the digital image signals as required to enable controller section 7 to store and handle the image in the form and order required to carry out the job programmed. After processing, the image signals are output to controller section 7. Image signals derived from net 5 are similarly input to processor 25c.

Processor 25c also provides enhancements and changes to the image signals such as filtering, thresholding, screening, cropping, scaling (reduction/enlargement), etc. Following any changes and adjustments in the job program which affect these image processing parameters, the document is typically rescanned to capture the specified modification.

Printer section or print engine 8 comprises a laser type printer having a Raster Output Scanner (ROS) 87, Print Module 95, Paper Supply 107, Finisher 120, and Printer System Control 128. ROS 87 has a two beam laser with the beams modulated in accordance with the content of an image signal input by acousto-optic modulator to provide dual imaging beams which are scanned across a moving photoreceptor of Print Module 95 by means of a rotating polygon. This exposes two image lines on the photoreceptor with each scan to create the latent electrostatic images represented by the image signal input to the modulator.

The latent electrostatic images are developed and transferred to a print media delivered by paper supply 107. As will be appreciated by those skilled in the art, print media can comprise a selected one of various known substrates which are capable of accepting an image, such substrates including transparencies, preprinted sheets, vellum, glossy covered stock, film or the like. The print media may comprise any of a variety of sheet sizes, types, and colors, and for this, plural media supply trays 110, 112, 114 (FIG. 1) are provided. The transferred image is permanently fixed or fused and the resulting prints discharged to either output tray 118 (FIG. 1), or to finisher 120. Finisher 120 provides certain finishing selections such as a stitcher for stitching or stapling the prints together to form books, a thermal binder for adhesively binding the prints into books, and/or other finishing options such as slitting, perforating, saddle stitching, folding, trimming, or the like.

Printer system control 128 (FIG. 2) automatically and precisely controls all the printer functions and operations in accordance with job program parameters received from system control 54 of controller section 7, as well as from internally derived signals from sensors and processes within the printer section 8. Printer system control signals are derived and distributed via a plurality of printed wiring boards (PWBs) in a multiprocessor architecture characterized by multiple microprocessor controller cores, serially interconnected, and also serially linked to more numerous input/output processing circuit PWBs. Controller section 7 is, for explanation purposes, divided into an image input control 50, User Interface (UI) 52, system control 54, main memory 56, image manipulation section 58, and image output control 60. The units 50, 54, 56, 58, 60 comprise a system which may also generally be referred to as the "Electronic Subsystem" (ESS).

The scanned image data input from processor 25c of scanner section 6 to controller section 7 is compressed by image compressor/processor 51 of image input control 50 and placed in an image file. Image files, which represent different print jobs, are temporarily stored in system memory 61 (seen in FIG. 3) pending transfer to main memory 56 where the data is held pending use.

Referring again to FIG. 1, UI 52 includes a combined operator controller/CRT display consisting of an interactive touchscreen 62, keyboard 64, and mouse 66. In one specific embodiment, UI 52 is a DocuSP controller implemented on a Sun® platform. The DocuSP controller or UI 52 is the connection between the user and the print system. The DocuSP software also performs the necessary data conversion on incoming electronic print input created by client software in ASCII, TIFF, HP PCL, PostScript, or PDF format passed through the network connection. Following conversion, the DocuSP software creates an electronic file which is stored temporarily in a print queue on the controller 7. This electronic image is subsequently passed on to the printer for production.

The user communicates through the DocuSP software by selecting and managing the jobs displayed on the print services interface or touchscreen 62 and sending them to the printer for production. The system also communicates messages and instructions to the user on the touchscreen 62. The four components of the DocuSP controller are the processor or system control 54, the monitor 62, the keyboard 64, and the mouse 66.

UI 52 interfaces the operator with printing system 2, enabling the operator to program print jobs and other instructions, and to obtain system operating information, visual document facsimile display, programming information and icons, diagnostic information and pictorial views, etc. Items displayed on the touchscreen 62 such as files and icons are actuated by either touching the displayed item on screen 62 with a finger, by using mouse 66 to point a cursor to the item selected and keying the mouse, or by utilizing the keyboard 64.

Main memory 56 (FIG. 2) has plural hard disks 90-1, 90-2, 90-3 for storing machine Operating System software, including, but not limited to, the DocuSP software, machine operating data, and the scanned image data currently being processed. When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 where the additional processing steps such as collation, make ready (document editing), decomposition, rotation, etc., are carried out. Following processing, the data may be returned to main memory 56, sent to UI 52 for display on touchscreen 62, or sent to image output control 60.

Figure 3:
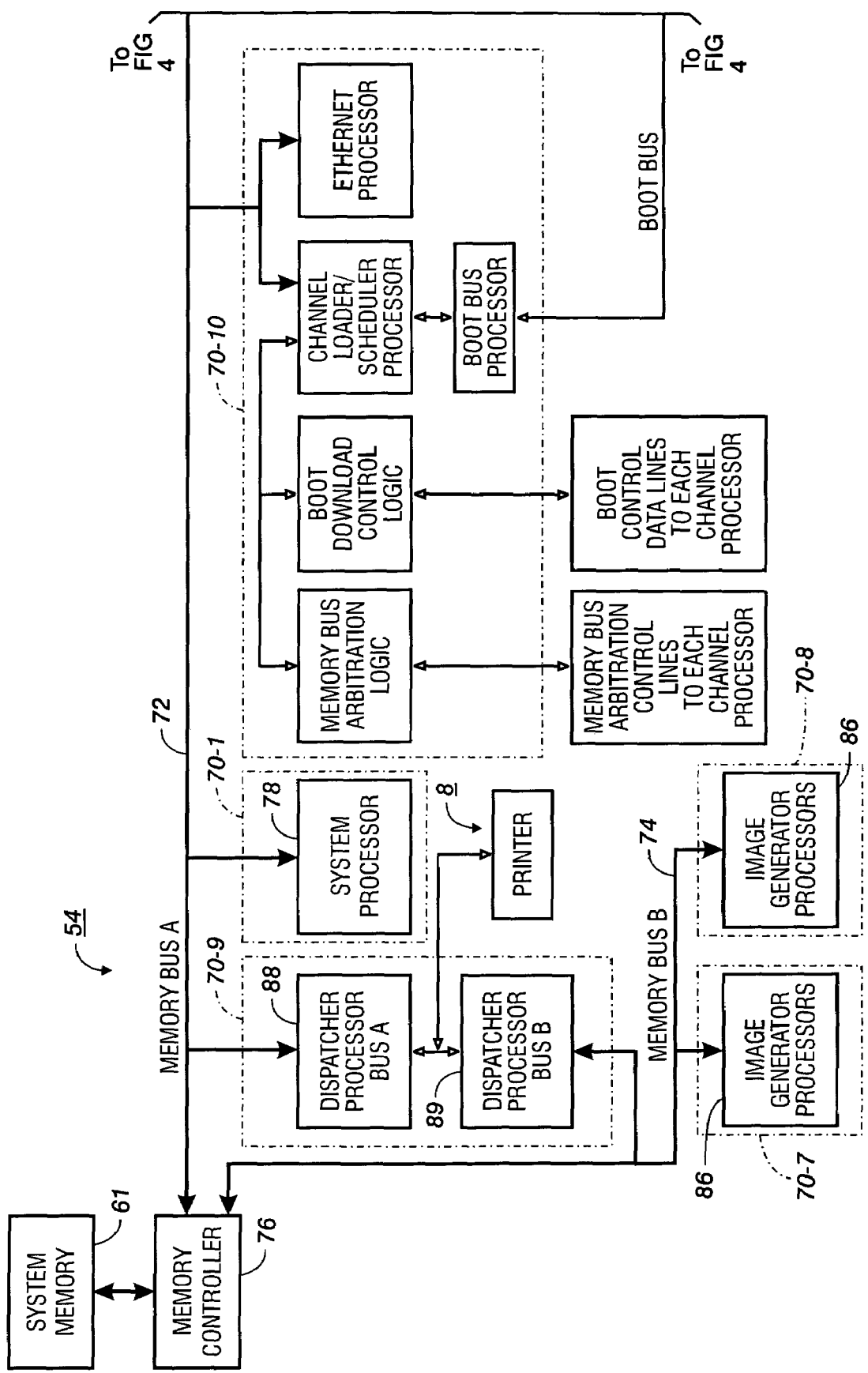
FIGS. 3-5 comprise a schematic block diagram showing the major parts of a controller for the printer shown in FIGS. 1 and 2.
Figure 4:
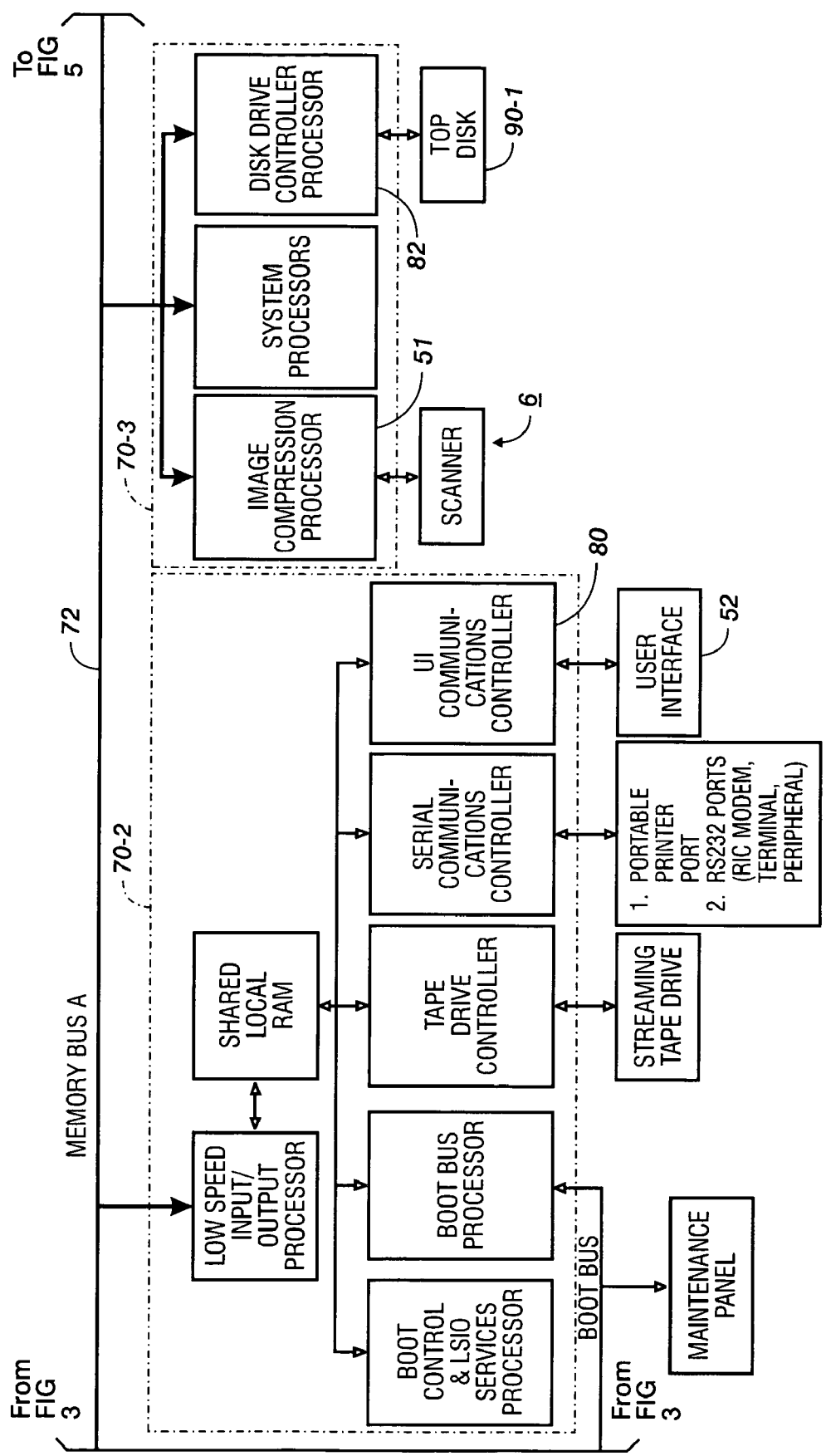
Figure 5:
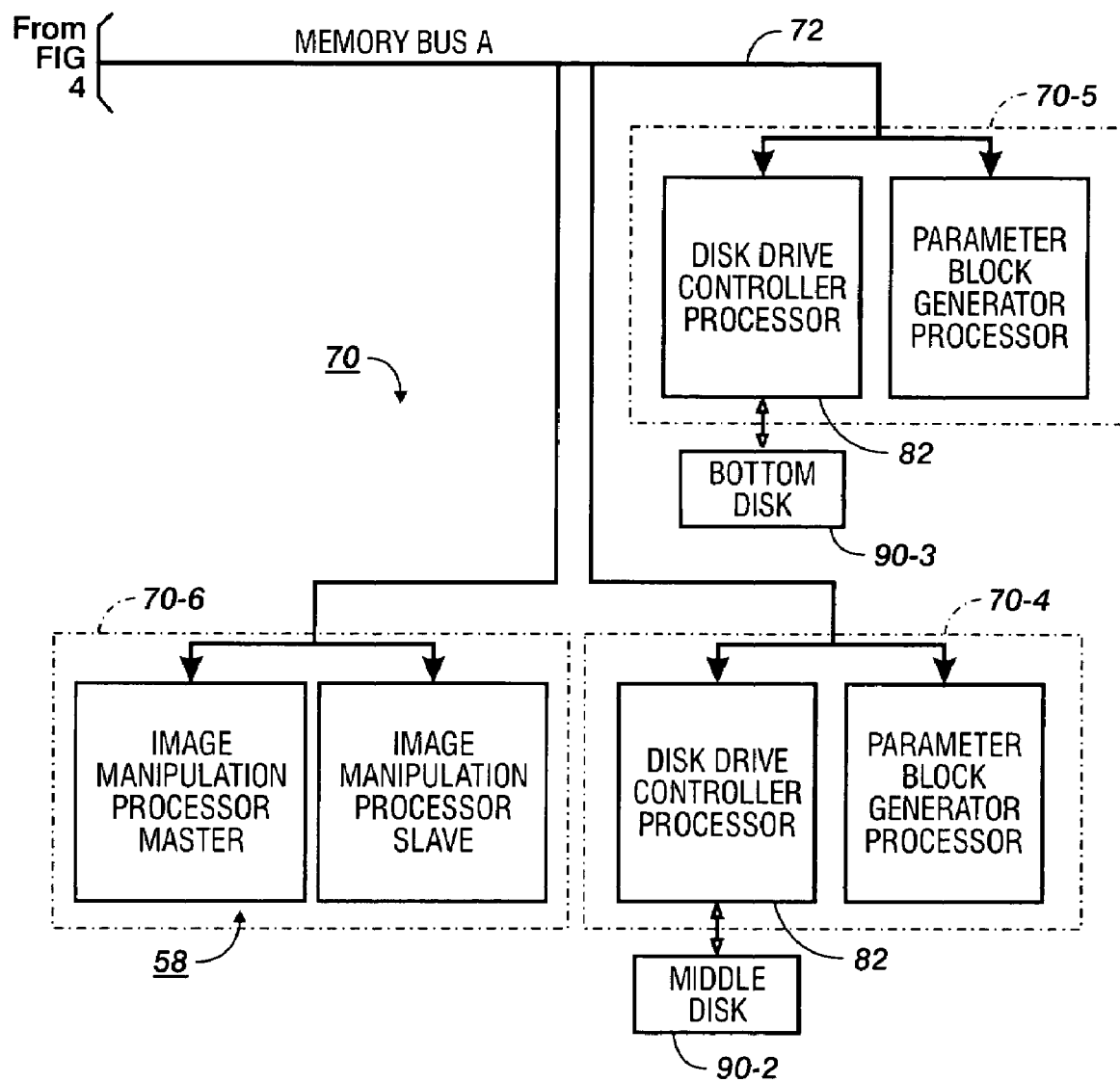

Referring particularly to FIGS. 3-5, image data output to image output control 60 is decompressed and readied for printing by image generating processors 86 of PWBs 70-7, 70-8. Following this, the data is output by dispatch processors 88, 89 on PWB 70-9 via Scan Line Buffer (SLB) 139 (FIG. 2) to printer section 8. Image data sent to printer section 8 for printing is normally purged from memory 56 to make room for new image data.

Control section 7 includes a plurality of Printed Wiring Boards (PWBs) 70 (FIGS. 3-5), PWBs 70 being coupled with one another and with System Memory 61 by a pair of memory buses 72, 74. A memory controller 76 couples System Memory 61 with buses 72, 74. PWBs 70 include system processor PWB 70-1 having plural system processors 78; low speed I/O processor PWB 70-2 having UI communication controller 80 for transmitting data to and from UI 52; PWBs 70-3, 70-4, 70-5 having disk drive controller/processor 82 for transmitting data to and from disks 90-1, 90-2, 90-3 respectively of main memory 56 (image compressor/processor 51 for compressing the image data is on PW8 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

As described, print jobs may be derived from multiple sources, i.e., jobs scanned in using scanner 6 for printing; jobs scanned in, stored, and then edited or added to for printing later; jobs remotely scanned in and submitted to the printer system 2 as, for example, through net 5 (FIG. 2); jobs remotely developed and then submitted to the system for printing from an input/output apparatus 176 (FIG. 7) such as, for example, a workstation or PC 168. A job may be sent to the printing system 2 from an application running on a workstation or PC 168 by using print drivers or from a web browser. Printing to the printing system 2 using a print driver requires that the workstation or PC 168 be connected to the network to which the printing system 2 is connected or be directly connected to the printing system 2 and that the workstation or PC 168 has the appropriate print driver loaded thereon. The user may then submit a print job by selecting print from an application and the print driver submits the job to the printer.

Xerox® printer drivers (for the Nuvera®, DocuTech®, DocuPrint® and DocuColor® product lines) for workstations or PCs 168 include 'Special Pages' capabilities. Special Pages allows a user to specify that specific page(s) have different programming (e.g. paper type) than the job's programming. When a user selects the print option in an application on which an electronic document has been created, the print driver resident on the workstation or PC 168 generates an application's print dialog 600 which is presented on the display 166 of the workstation or PC 168. While the available features vary depending on the type of DocuTech® and other MFDs print driver, generally, as shown, for example, in FIG. 6, driver tabs 602, 604, 606, 608, 610 providing access to various print driver functions are accessed through the application's print dialog 600. Driver setting changes on these tabs apply to the open document and application, and are temporary.

Figure 6:
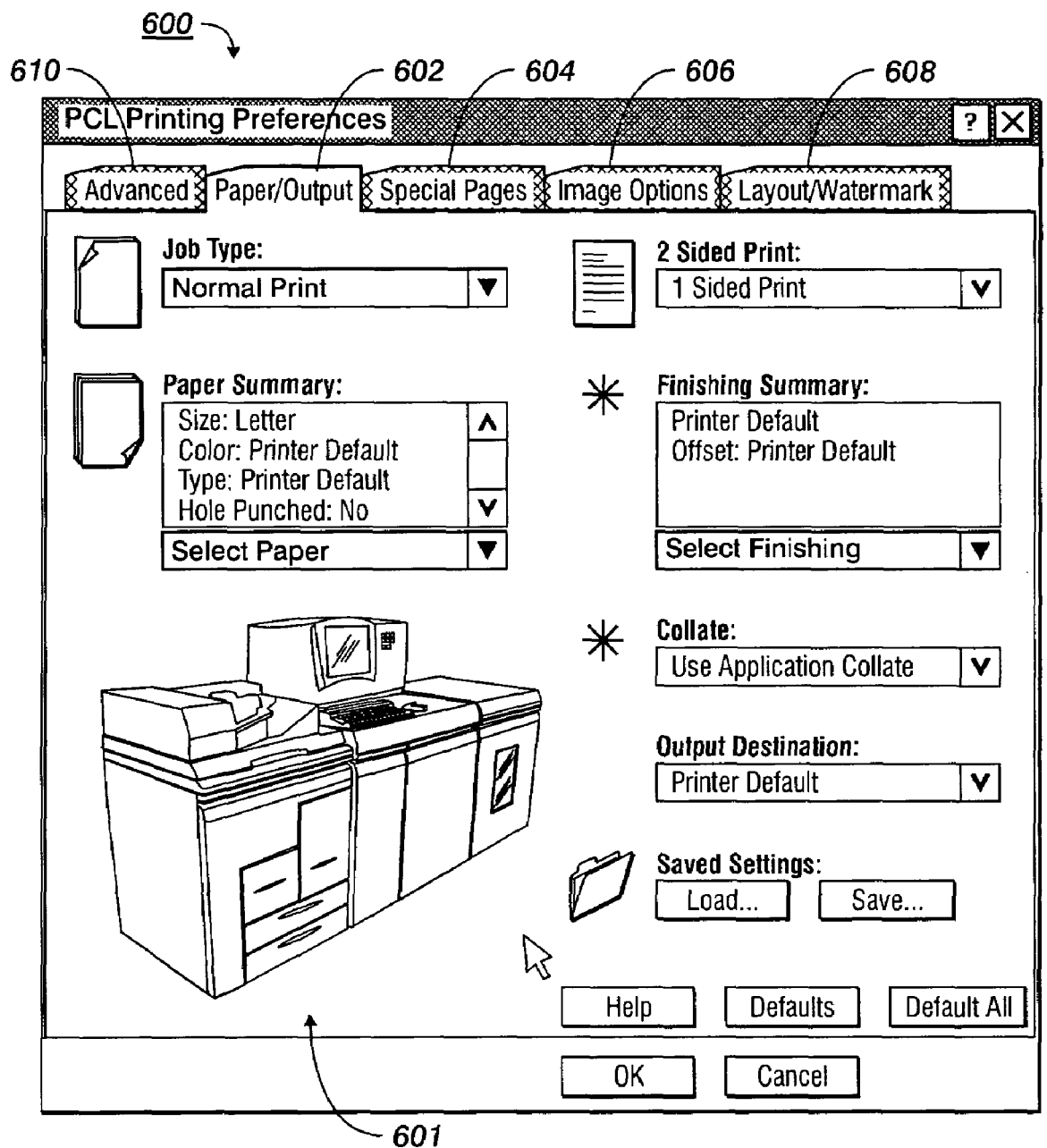
FIG. 6 is a view of an application's print dialog generated by a print driver for a print system of the type with which the disclosed apparatus and method are utilized.

In FIG. 6, the print dialog 600 displays the Paper/Output tab screen 601 that is displayed by default upon entry into the print dialog 600 or through selecting the Paper/Output tab 602 when in some other tab screen. The Paper/Output tab 602 provides the user access to the most frequently used features which is why the Paper/Output tab screen 601 is displayed by default upon entry into the print dialog 600. For example, the user having selected the Paper/Output Tab 602 can choose from the Paper/Output tab screen 601 to print on two sides of the paper, select specific media on which to print, or hold a print job. The Paper/Output tab screen 601 also presents the finishing options, which may include, depending on the type of finisher installed in the printing system 2, collate, bind, staple, or fold options.

Other tabs present of the print dialog 600 include the Special Pages tab 604, the Image Options tab 606, the Layout/Watermark tab 608 and the Advanced tab 610. The print dialog screen 600 may also include other tabs, such as, for example, a Job Notes tab, that provides access to other functions of the printing system 2. The Special Pages tab 604 when selected causes the print dialog 600 to display the Special Pages tab screen 800 that has features for adding Covers, Inserts, and Exceptions (specifying media/page characteristics on a per page basis). It is through the Special Pages tab screen 800 that the user obtains access to the Insert a scan option of this disclosure. The Image Options screen (not shown), generated upon selection of the Image Options tab 606, groups together those features that are related to image manipulation, such as Reduce/Enlarge, Lighten/Darken, or Mirror Image, a feature that flips the image from left to right, thereby reversing the image and all associated text. The Layout/Watermark screen (not shown), generated upon selection of the Layout/Watermark tab 608, contains all features that relate to Booklet Layout and Watermarks. The Advanced tab screen (not shown), generated upon selection of the Advanced tab 610, contains those features that infrequently change once set, such as custom paper size setup, TrueType Font options, Default Paper Sizes, and Xerox Job Ticket setup.

Figure 7:
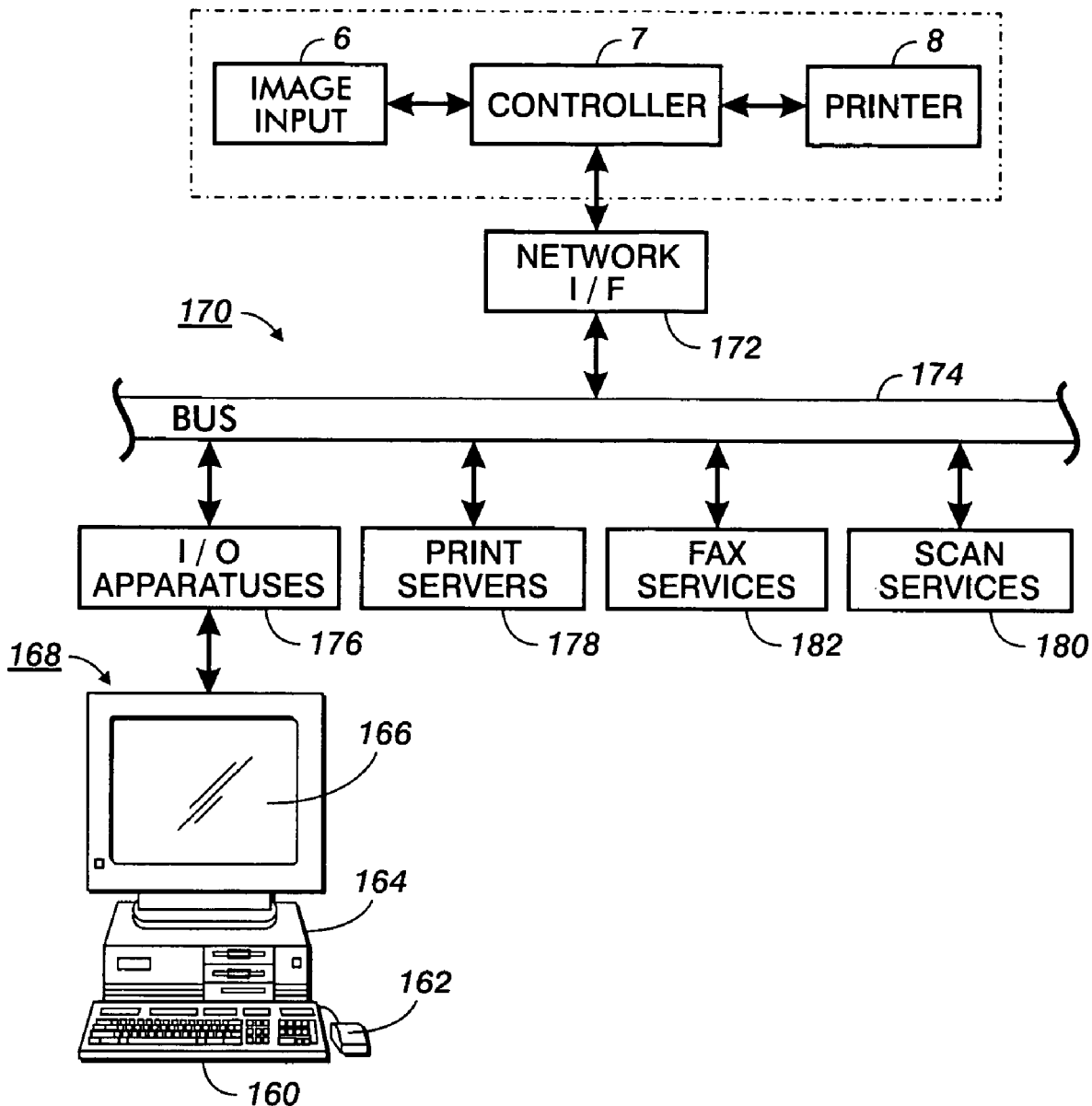
FIG. 7 is a block diagram depicting a network printing system including the printing system of FIG. 2.

Referring to FIG. 7, the controller 7 is coupled with network arrangement 170 by way of a network interface 172. The network interface 172 includes all of the hardware and software necessary to relate the hardware/software components of the controller 7 with the hardware/software components of the network arrangement 170. For instance, to interface various protocols between the server and the network arrangement, the network interface could be provided with, among other software, Netware® from Novell Corp.

In the network arrangement 170, various I/O and storage devices are interconnected with a bus 174. In particular, the devices include, among others, the following: I/O Apparatuses 176, Print Services 178, Scan Services 180 and facsimile ("FAX") Services 182. In the present example a given I/O Apparatus may include a telephone (not shown) and/or a workstation or PC 168. The workstation or PC 168 includes a display screen 166, a CPU 164, and input devices such as a keyboard 160 and/or a mouse 162. In one example, the telephone, PC and FAX capability is provided by an integrated digital apparatus, such as that manufactured by Canon Corp. under the series name of "Navigator HD40".

In one embodiment, the printing system 2 is a DocuTech® Network Printing System ("Network Printer") which prints or otherwise outputs, e.g. sending to the facsimile device 182, jobs transmitted from one of the I/O apparatuses 176, such as a Xerox® 6085 workstation 168. In one embodiment, the Network Printer processes network jobs written in a page description language ("PDL") known as "Interpress" and as a prerequisite to printing or otherwise outputting the network job, the Network Printer decomposes the job from a high level primitive form to a lower level primitive form. In another embodiment the printing system 2 is used, in conjunction with a DocuTech® Network Server, see Print Services 178, to print or otherwise output jobs written in, among other PDLs and Postscript. Decomposed jobs are commonly stored, for output, in a job file (not shown) of the printing system 2 and later transferred to a suitable print queue or output queue for printing or other output.

Preferably, the Scan Service 180 includes a workstation and a scanner, provided in the form of a package. This sort of package is made available by Xerox Corporation in the form of a WG40 scanner coupled with a 6085 workstation. It will be appreciated that the Scan Service is preferably provided with Optical Character Recognition ("OCR") capability. Finally, the FAX Service 182 assumes the form of any suitable networked FAX device, such as the LAN FAX Service manufactured by Xerox Corporation under the 7032 series.

It should be appreciated that there are situations in which a user wishes to develop a job even when all of the input for the job is not currently available. Portions of the job may not be available because, among other reasons, pages/images are still being produced or delivered, e.g. photographs are being developed and printed, or pages/images may exist in non-scanable formats, such as pre-printed material, electronic images, or variable data from data bases. Alternatively there may be reasons why it is desirable to segment a job using page/image placeholders even though all the input is actually available. For instance, some pages/images may require different image process settings for optimum image quality, some pages/images may require different paper handling modes (recirculating document handlers as opposed to platen handling), and some pages/images may require different format scanners (document scanner versus transparency scanner). The following description is directed toward an approach which permits users of the printing systems 2 to create and manage page/image placeholders (logical tags) with a job during job structure creation in order to allow a scanned image of a hardcopy document to be added to an electronic document by the user scanning the hardcopy document after the electronic document has been sent to the printing system 2 for printing or other output.

This disclosure describes an implementation of the method and apparatus for inserting hardcopy pages in a print job that utilizes a modified form of 'Special Pages' function available on print drivers for the DocuTech® printer. As mentioned previously, the Special Pages function is also available in print drivers for Nuvera®, DocuPrint® and DocuColor® product lines. While described as utilizing specific print drivers for workstations and PCs 168 coupled to a specific printing system 2, it is within the scope of the disclosure for appropriate print drivers and other interfaces (such as web integration) to enable images of hardcopy documents to be inserted during printing or other output on other multifunction devices ("MFD"s). The Special Pages function permits the user to identify insertion points in a document being sent to the printing system 2 or other MFD wherein a special type of page is to be inserted before or after a page in the electronic document being printed or output as a finished document. Thus, those skilled in the art will easily understand how to modify the Special Pages function of the print driver, or similar functions of other print drivers, to permit the identification of 'hardcopy insertion' points as a new type of Special Page. After selecting the print option in an application on a workstation or PC 168, the user selects the special pages tab 604 in order to identify locations for hard copy insertion points in the electronic document being printed. A user specifies after which page a scanned-in page will be added. As such, a user programs the print job to include placeholders for scanned in pages.

Figure 8:
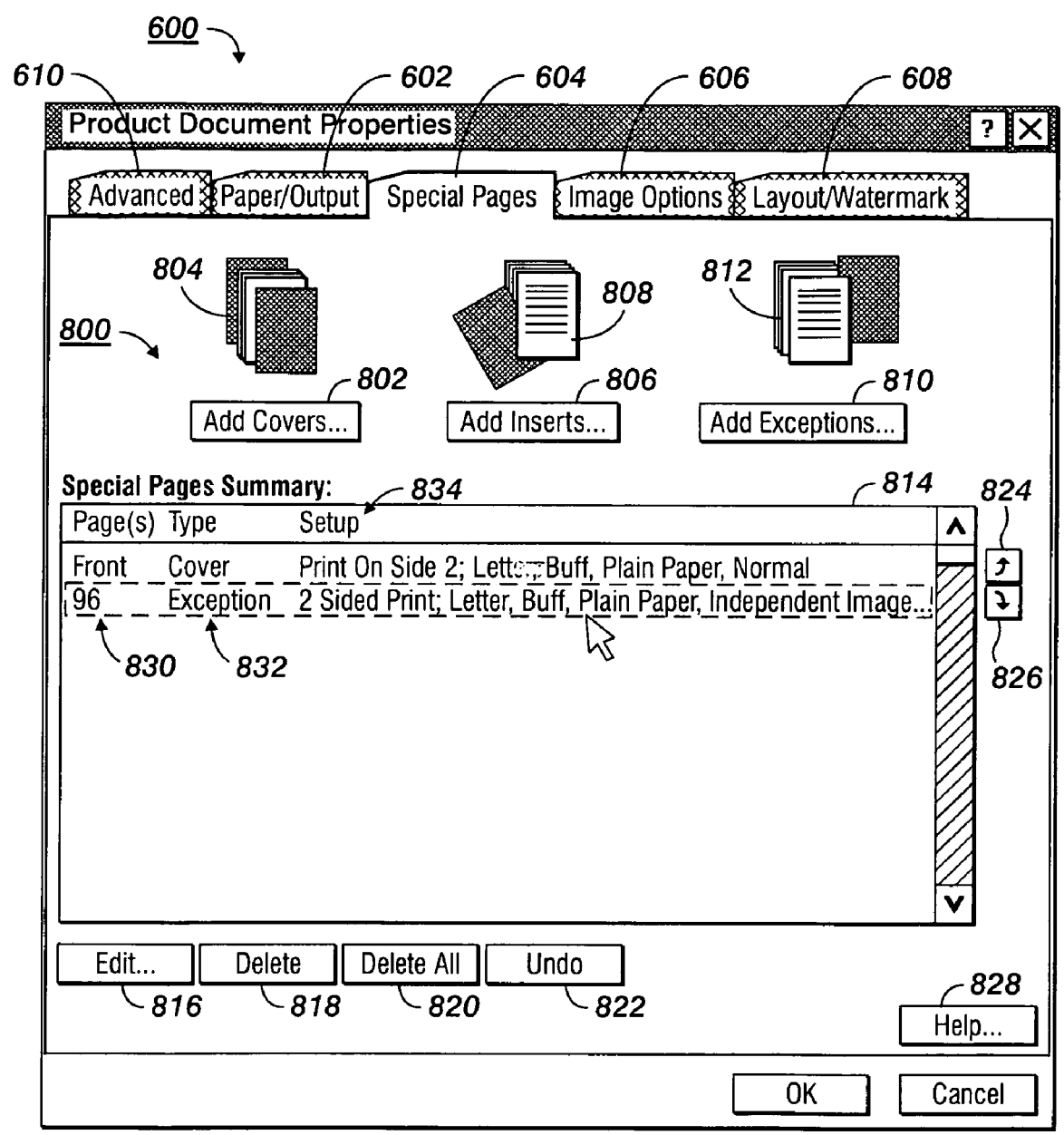
FIG. 8 is a view of the Special Pages tab screen of the applications print dialog of FIG. 6.

Referring to FIG. 8, there is shown a special pages top level or tab screen 800 that is displayed on the display 166 of the user's workstation or PC 168 when the Special pages tab 604 is selected. The illustrated Special Pages Tab Screen 800 contains a window-bearing button labeled "Add Covers . . . " 802, an Add Covers window-bearing icon 804, a window-bearing button labeled "Add Inserts . . . " 806, an Add Inserts window-bearing icon 808, a window-bearing button labeled "Add Exceptions . . . " 810, an Add Exceptions window-bearing icon 812, a table labeled "Special Pages Summary:" 814, a window-bearing button labeled "Edit . . . " 816, a command button labeled "Delete" 818, a command button labeled "Delete All" 820, a command button labeled "Undo" 822, a set of Promote and Demote buttons 824 and a window-bearing button labeled "Help" 828. The Special Pages Summary table 814 contains a Page(s) column 830, a Type column 832 and a Setup column 834 ordered left to right.

Selecting the Add Covers button 802 or icon 804 opens a Covers window (not shown) that permits the user to select front and back covers for the finished document to be printed from the electronically stored document. Selecting the Add Inserts button 806 or icon 808 opens the Inserts window 900 that permits the user to add material to be inserted in the finished document between pages or on pages of the electronically stored document to be printed. Such inserted material may include pre-printed and blank dividers available in the feed tray of a finishing device 120, pages from other electronically stored documents which may include desired text and or graphics and documents not yet stored that are to be scanned from a hardcopy at the time of printing the finished document. The Add Inserts button 806 may be disabled when a maximum number of Inserts has been reached. Selecting the Add Exceptions button 810 or icon 812 opens the Exceptions window (not shown) that allows the user to program special characteristics for specific pages or a range of pages within a job. For example, page 4 of the document can be programmed to print on pink paper, and only on one side.

If the Special Pages table 814 is empty, then the Edit window-bearing button 816, Delete command button 818, Delete All command button 820, Undo command button 822 and the Promote/Demote buttons 824, 826 are disabled. If more than one row is selected in the Special Pages table 814 and the rows contain mixed types then, the Edit window-bearing button 816 is disabled. If the Edit window-bearing button 816 is selected and the type is "Cover", then the Covers window (not shown) opens and displays the values of the selected Cover. If the Edit window-bearing button 816 is selected and the type is "Insert", then the Inserts dialog 900 opens and displays the values of the selected Insert. If the Edit window-bearing button 816 is selected and the type is "Exception", then the Exceptions dialog (not shown) opens and displays the values of the selected Exception.

Selecting the Delete button 818 launches a Yes/No confirmation dialog (not shown) titled "Delete Special Page(s)" with the string "Are you sure you want to delete the selected special page(s)?" Selecting Yes on the confirmation dialog removes the selected the rows from the Special Pages Summary table. Selecting No on the confirmation dialog closes the dialog and no action is taken. Similarly, selecting the Delete All button 820 launches a Yes/No confirmation dialog (not shown) titled "Delete Special Page(s)" with the string "Are you sure you want to delete all the special page(s)?" Selecting Yes on the confirmation dialog removes all the rows from the Special Pages Summary table. Selecting No on the confirmation dialog closes the dialog and take no action. The Undo button 822 is available when operations have been performed in the Special Pages Summary table 814 during the current session. Selecting the Undo button 822 reverses the last operation performed.

Selecting the Promote and Demote Inserts buttons 824, 826 moves the inserts after they are added to the table 814. These buttons 824, 826 provide the ability to move an insert up or down among inserts added after the same page. For example if four different inserts of varying types have been added, and the last one added should come first, the user can select the three other inserts and press Demote button 826 or select the last insert and press Promote button 824 three times to get the desired state. The Promote/Demote buttons 824, 826 are active only when Page Insert item(s) have been selected in the table and can be logically moved, other wise they are disabled.

If a front cover is programmed, then its summary is displayed as the first row in the Special Pages Summary table 814. The Special Pages Summary table 814 sorts Inserts and Exceptions by order of the first page number listed in the Page(s) column 830. When inserts and page exceptions have the same page number the page exception is listed first. When multiple inserts with the same page number are defined, they are originally listed by creation order (first to last). If Inserts with page ranges are defined in the Page(s) text field 918 on the Add/Edit Inserts dialog 900, then each page of the range is added as a row to the Special Pages Summary table 814.

The user can select a stop code to tell the printing system 2 to stop printing from the electronic document and instead insert a page that might be blank, contain printed material conforming to another stored electronic document or contain an image of a scanned hardcopy document by either selecting the Add Inserts button 806, the Inserts icon 808 or by selecting an already existing insert in the Special Pages Summary table 814 and selecting the Edit button 816. If the Add Inserts button 806 or inserts icon 808 is selected, then an Inserts dialog box 900 is displayed that includes the title "Add Inserts" in its title bar 902. If the Edit button 818 is selected and an Insert Type is selected in the Special Pages Summary table 814, then an Inserts dialog box 900 is displayed that includes the title "Edit Inserts" in the title bar 902. The title bar 902 thus simply provides an indication of the path by which the Inserts dialog box 900 was reached.

Figure 9:
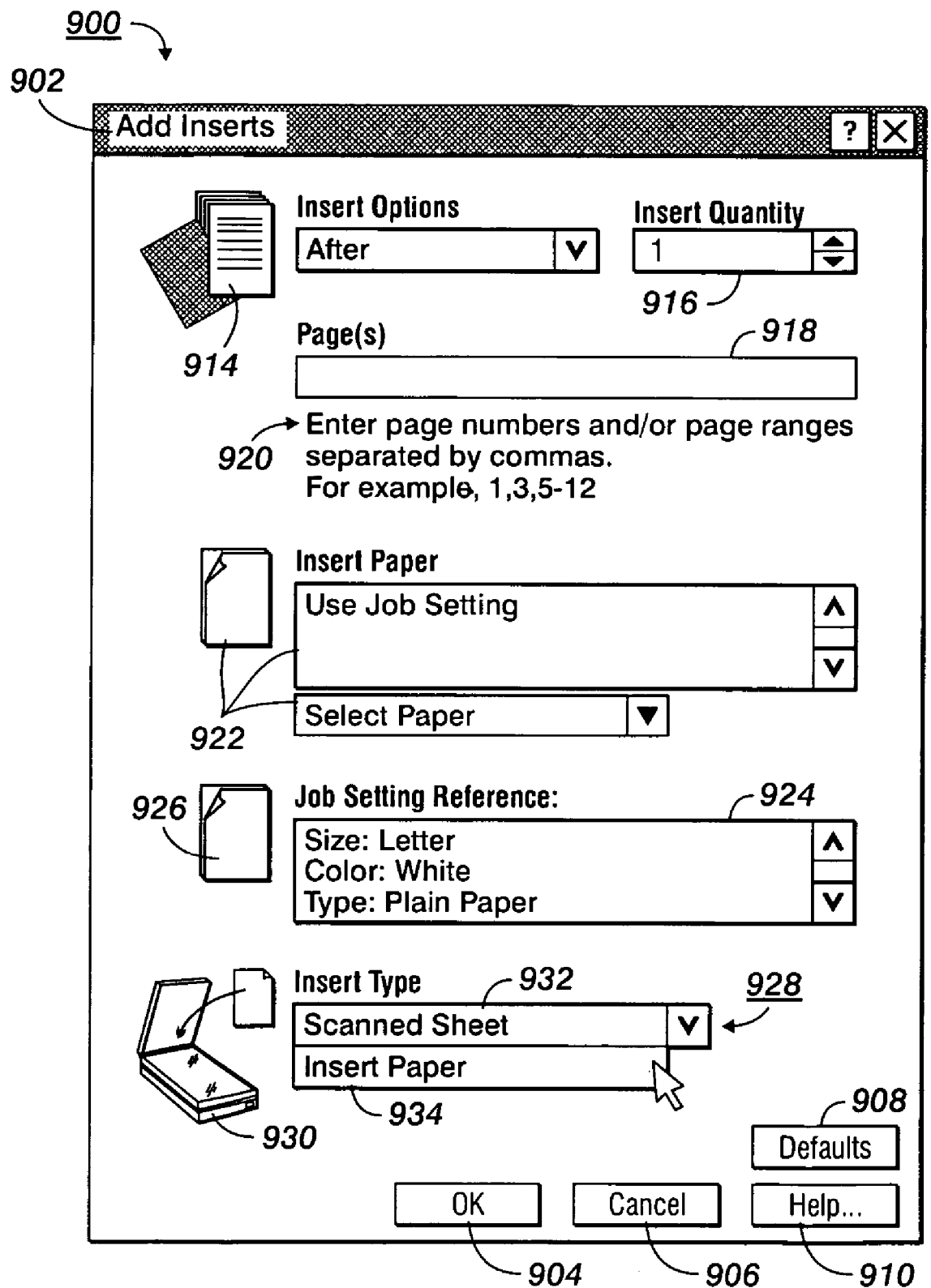
FIG. 9 is a view of an Inserts dialog box generated when a user selects to add an insert from the Special Pages tab screen of FIG. 8, a similar insert dialog box with a different title is generated when the user selects to edit an insert on the Special pages tab screen.
Figure 10:
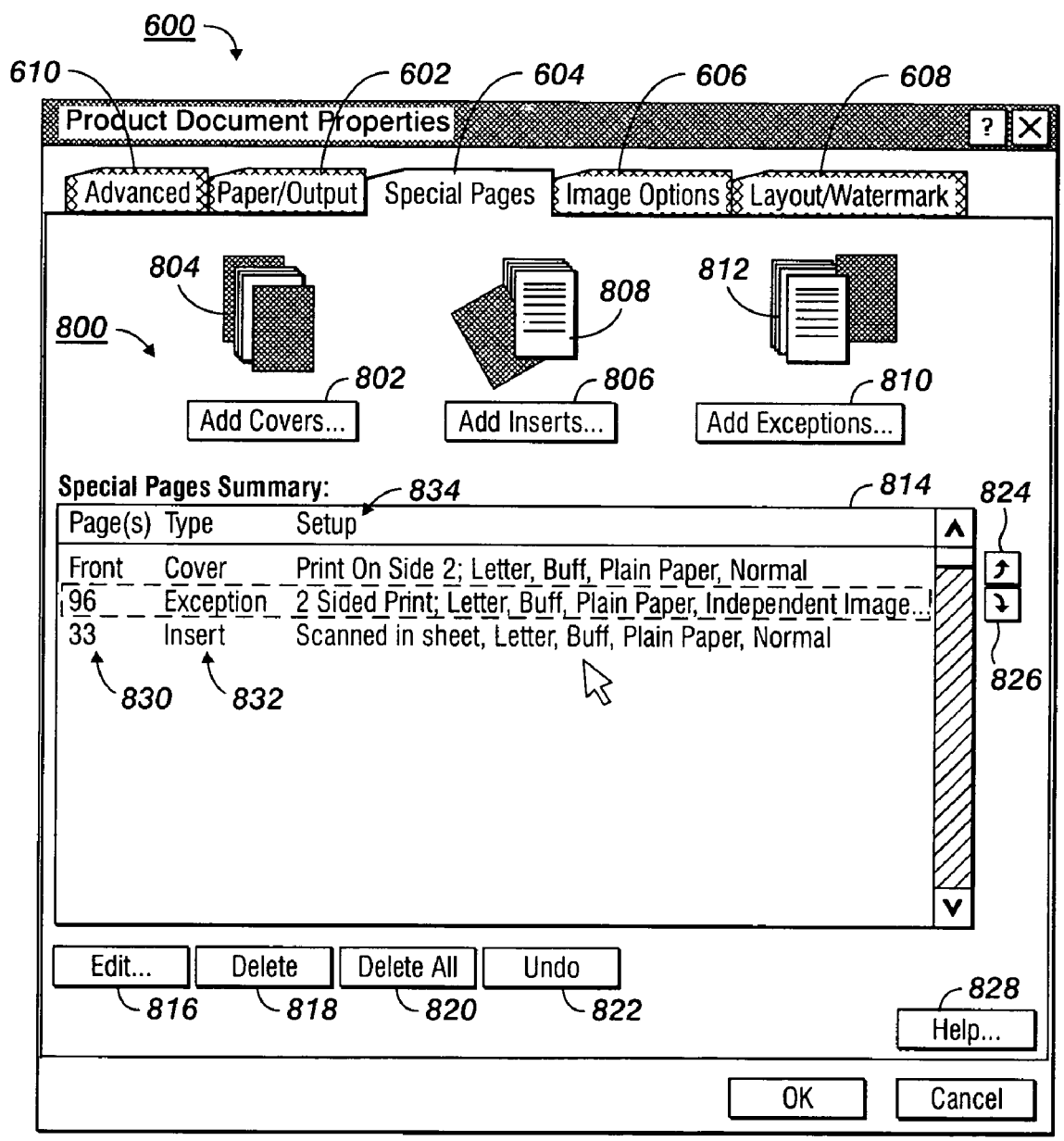
FIG. 10 is a view of the Special Pages tab screen of the applications print dialog after a user has designated that an insert of a hardcopy to be scanned at the time of printing should be added as a special page to the document being printed.

As shown, for example, in FIG. 9, the Inserts dialog box 900 contains the following command buttons: a command button labeled "OK" 904; a command button labeled "Cancel" 906; a command button labeled "Defaults" 908 and a command button labeled "Help" 910. Selecting the Cancel command button 906 closes the Inserts dialog box 900 and returns the display to the Special Pages tab screen 800. Selecting the Help command button 910 launches context sensitive help. In the illustrated embodiment, selecting the OK command button 904 checks for errors, saves the information entered and populates the Special Pages Summary Table 814 with the appropriate values, as shown, for example, in FIG. 10.

The Inserts dialog box 900 also contains the following: a drop down list box labeled "Insert Options:" 912, an interactive Insert Options icon 914, a spin box labeled "Insert Quantity:" 916, a text field labeled "Page(s):" 918, instructional text 920; a group of controls used for selecting the Paper 922; a list box labeled "Job Setting Reference:" 924; a Job Setting Reference icon 926, a drop down list box labeled "Insert Type" 928 and an interactive Insert Type icon 930.

The Inserts Options drop down list box 912 is populated with an After and a Before Page 1 selectable option. If the Insert Options drop down list box 912 is set to the Before Page 1 option then the Page(s) text field 918 is disabled and shows no value and the text 920 is grayed. When Multiple Selection Edit (i.e. two or more rows in the Special Pages Summary table 814 are selected and the Edit button 816 is actuated on the Special Pages tab screen 800 to enter the insert window 900) is used, selecting the Default button 908 does not affect features that cannot be edited with Multiple Selection Edit.

The Inserts window includes the Insert Type drop down list box 928 and the interactive Insert Type icon 930 that provide the user with the option of inserting an image of hardcopy document by scanning the hardcopy document at the time of printing of the electronic document being sent to the print system 2. When either the Insert Type drop down list box 928 or the interactive Insert Type icon 930 is selected a drop down list is displayed populated with the options of Scanned Sheet type 932 and Insert Paper type 934 for the insert.

If the scanned sheet type 932 is selected, a flag or tag, acting as a hardcopy-insertion point identifier, is provided in the header of the print job file sent through the network 5 or direct connection to the printing system 2 to indicate that a scanned image of a hardcopy document is to be inserted into the electronic document at the time of printing. Once all job programming is completed (including the specification of hardcopy-insertion points), the user submits the print job to the printing system 2.

When the printer system 2 receives a job with a Scanned Sheet type 932 insert choice, in the disclosed embodiment, the controller 7 holds the print job until it is selected for release by the user through the select job command or close screen 1120 (in the background in FIG. 11) displayed on the UI 52 of the printer system 2. Holding jobs and releasing jobs are well known functions of printer systems 2. As shown, for example, in FIG. 11, upon the user selecting a job that includes one or more Scanned Sheet type of insert points for release, the controller 7 of the printer system 2 provides the user with a local held job screen 1100 on the touch screen 62 of the UI 52 of the printer system 2 that advises the user to scan in the sheet(s) to be inserted into the print job. The controller 7 is programmed to place scanned in sheets in the finished document at the appropriate insertion points in the print job upon scanning of the hardcopies by the user.

At the printing system 2, the controller 7 reads the print job's header and if the header includes the hardcopy-insertion point tag recognizes that the job requires additional pages. The controller 7 is programmed to identify the hardcopy insert flag or tag in the print job's header and take appropriate action. Upon identifying a hardcopy insert flag or tag, the controller 7 places the job containing the flag or tag on hold with a reason of "waiting for additional pages". The user goes to the printing system 2 and selects the submitted print job which is being held by utilizing the input device, such as the touch screen 62, keyboard 64 or mouse 66, of the user interface ("UI") 52 of the printing system 2 to interact with the select job command or close screen 1120. It is within the scope of the disclosure to include security identification with the print job so that only the correct individual can access the held submitted job at the UI 52 of the printing system 2. Such security identification and selection of held print jobs are commonly implemented on printing systems 2 and need not be described in detail.

Figure 11:
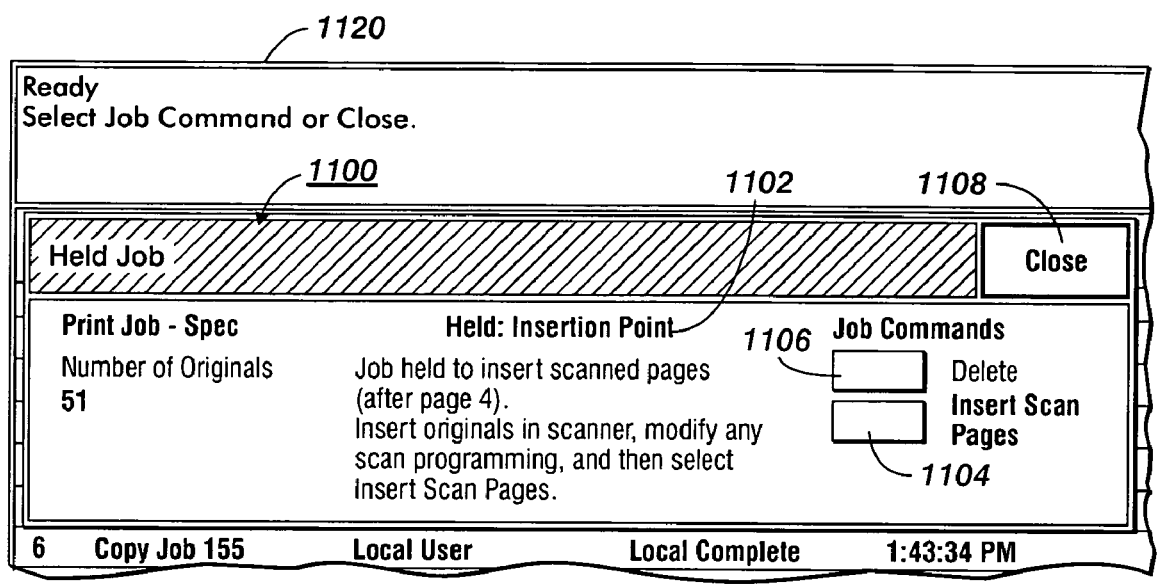
FIG. 11 is a view of a pop-up message screen presented on the user interface of the printer system.

Upon selection of the held job by the user, the controller 7 of the printing system 2 causes the touch screen 62 of the UI 52 to display to the user that the selected job requires hardcopy input and indicates where this input will be placed by providing a pop-up message held job screen 1100, as shown, for example, in FIG. 11. The pop-up message held job screen 1100 includes a text box 1102 illustratively containing the message "Held:Insertion Point Job held to insert scanned pages (after page 4). Insert originals in scanner, modify any scan programming, and then select Insert Scan Pages", an insert scan pages icon 1104, a delete icon 1106 and a close button 1108.

Figure 12:
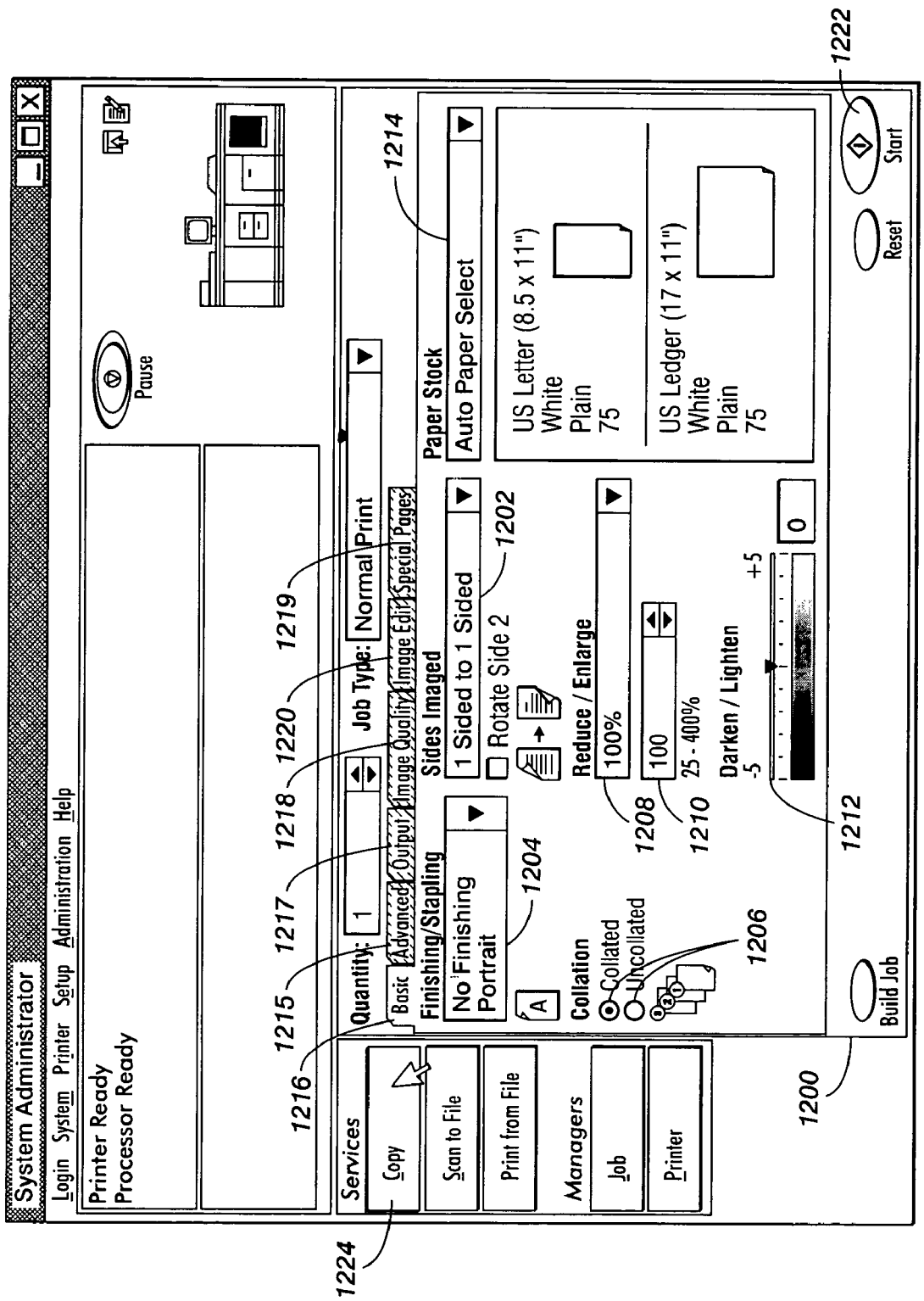
FIG. 12 is a view of a scan attributes screen presented on the user interface of the printer system.

Upon selection of the insert scan pages icon 1104, the controller 7 of the printing system generates the scan attributes screen 1200, as shown, for example, in FIG. 12 for display on the touch screen 62 of the UI 52 of the printing system 2. The user can, for example, interact with the sides imaged drop down list 1202, the finishing/stapling box 1204, the collation radio buttons 1206, the reduce/enlarge drop down list 1208 or adjustment box 1210, the darken/lighten slider 1212 or the paper stock drop down list 1214 available under the basic tab 1216 on the scan attributes screen 1200. Other programming attributes can be changed by interacting with buttons, sliders, drop down lists, text boxes, etc. available under the advanced tab 1215, the output tab 1217, the image quality tab 1218, the special pages tab 1219 or the image edit tab 1220.

The scan attributes screen 1200 presents to the user the programming attributes that will be applied to the scanned-in image (e.g. paper size, paper type) based on the print job's submitted programming. The user has the ability to use this programming or override it by specifying new programming via the local input device, such as the touch screen 62, keyboard 64 or mouse 66, of the UI 52 of the printing system 2. The DocuSP software currently presents such a scan attributes screen 1200 each time a user selects to scan a document at the printing system 2 by selecting the copy services tab 1224 and thus, the implementation and manner of utilization of the scan attributes screen 1200 need not be described in detail.

Once the user has selected the desired programming attributes of the hardcopy document to be scanned, the user selects the start button 1222 to initiate scanning of the hardcopy document. For each hardcopy insertion point, the user scans in the desired image. The controller 7 of the printing system 2 replaces each hardcopy insertion point with the actual image to be used. When all scanned-in images are done, the user can release the held submitted job. Upon release, the printing system prints or otherwise outputs a finished document including the electronic document with the images of the hardcopy documents inserted therein at the appropriate locations, i.e. a merged job.

Figure 13:
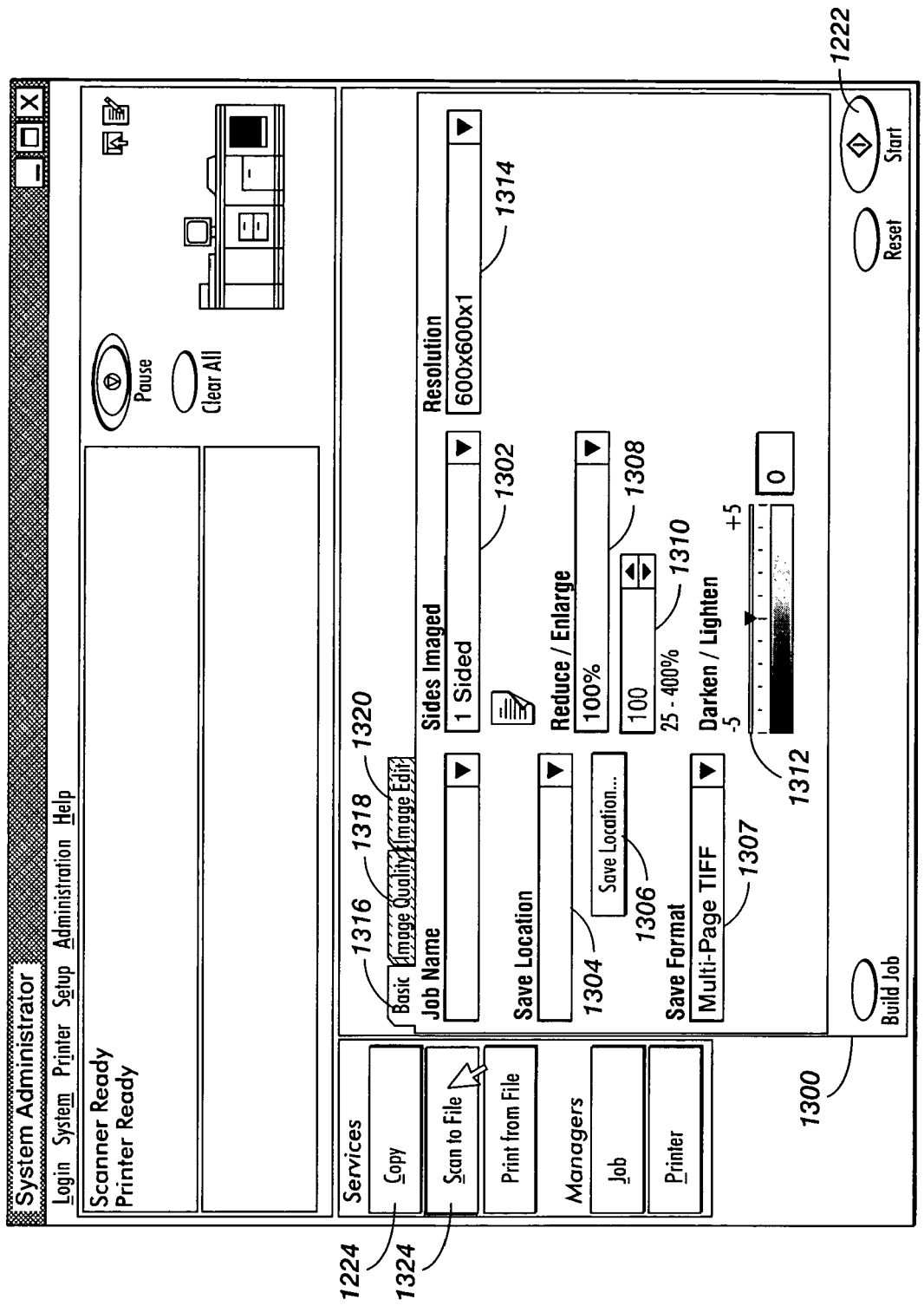
FIG. 13 is a view of an electronic copy screen presented on the user interface of the printer system; and, FIG. 14 is a flow diagram of a method of creating a finished printed document including an electronic document with images of a hardcopy document with a printing system including a print engine and a scanner.

The disclosed method and device allows the user to select to export the resultant merged job to an electronic file by utilizing the UI 56 of the printing system 2 to designate that the merged job should be saved. The DocuSP software currently presents such a scan electronic copy screen 1300 each time a user selects to scan a document at the printing system 2 by selecting the scan to file services tab 1324 and thus, the implementation and manner of utilization of the scan electronic copy screen 1300 need not be described in detail. To allow a finished job to be save to a file, the controller 7 generates a save electronic copy screen 1300, shown, for example, in FIG. 13, that displayed on the UI 56 of the printing system 2 after all of the hardcopy documents to be inserted into the electronic document with insert points have been scanned. The save electronic copy screen 1300 allows the finished document to be saved to a file with the desired attributes. The user can, for example, interact with the sides imaged drop down list 1302, save location text box 1304 or dialog button 1306, the save format drop down list 1307, the reduce/enlarge drop down list 1308 or adjustment box 1310, the darken/lighten slider 1312 or the resolution drop down list 1314 available under the basic tab 1316 on the save electronic copy screen 1300. Other programming attributes can be changed by interacting with buttons, sliders, drop down lists, text boxes, etc. available under the image quality tab 1318 and the image edit tab 1320.

If the user wants an electronic version, the image type for it (e.g. TIFF) and the remote location to which the electronic version is to be sent is specified by interacting with the save format drop down list 1307 and either the save location text box 1304 or dialog button 1306, respectively. The DocuSP software currently provides a similar function to permit scanned jobs to be saved from the UI 56 of the printing system 2 when the scan to file services button 1324 is selected and thus, those skilled in the art will recognize that such function can be easily modified to permit the saving of the merged job.

Figure 14B:
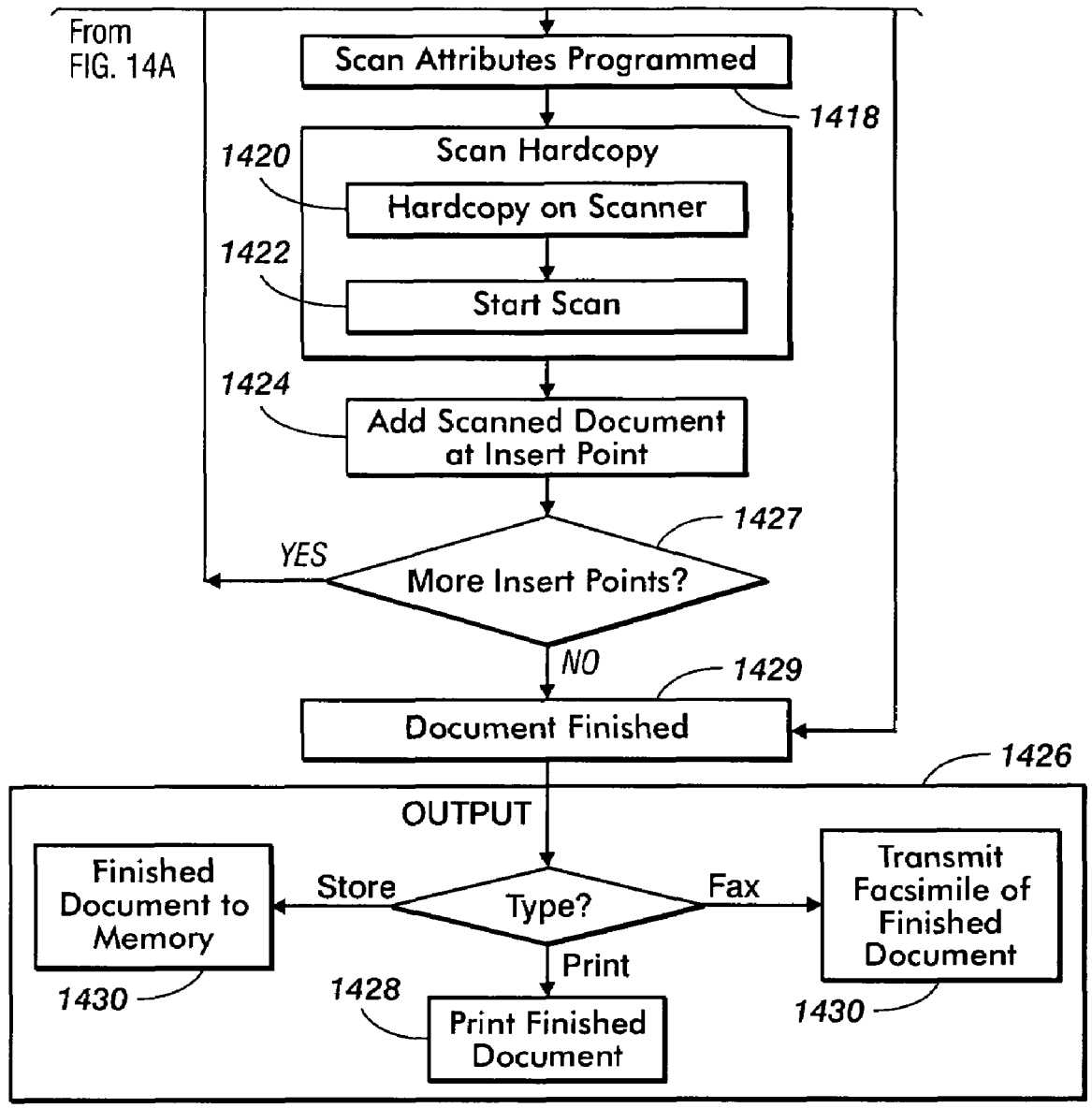

The method of creating a finished document including an electronic document with images of hardcopy documents inserted therein at designated locations is shown, for example, in FIGS. 14a and b. An input device such as a computer connected to a printing system including a scanner and a print engine is provided 1402. A user generates an electronic document utilizing the input device 1404. After generation of the electronic document, the user indicates desired locations in the electronic document for insertion of images of hardcopy document by providing hardcopy-insertion points 1406. The user sends the electronic document with hardcopy insertion points to the printing system 1408. The printing system identifies that the sent document includes hardcopy insertion points 1410 and places the sent document on hold 1412. The user selects this 'held' job by utilizing a user interface of the printing system 1414. The user interface of the printing system displays a screen indicating that the user needs to scan in pages for insertion 1416. On this screen a button would be provided to 'program scan sheets'. The instructions would say to "program the scan sheets and then hit the Start button". The user selects the Program Scan Sheets button and programs the attributes of the images of the hardcopy documents to be scanned 1418. After programming the scan attributes, the user places the hardcopy document where it can be scanned (on the platen or document feeder of the scanner of the printing system) 1420 and hits Start 1422. The printing system 2 scans in sheets and adds them to the job at the insertion point 1424. If no other insertion points exist, the job prints a finished document including the electronic document with images of the scanned hardcopy documents at the desired location indicated by the insertion points 1426. For instance, if the finished document is to be printed, the finished document is printed on a printer 1428, if the finished document is to be saved as an electronic document, the finished document is sent to memory 1430 and if the finished document is to be faxed, the finished document is sent to a facsimile machine or other facsimile software and transmitted to another facsimile machine 1432. If there are more insertion points (determined in step 1427), steps 1416, 1418, 1420, 1422 and 1424 are repeated.

For example, assume a user has a ten page electronic document and needs to add a photo before page 4 and an architectural sketch after page 10 and needs ten copies of the final document printed simplex on letter size paper. The user generates the electronic document and programs the print job with the two hardcopy-insertion points on an input device such as a workstation or computer coupled to the printing system 2 prior to submitting the job to the printing system 2 for printing. After submitting the printing job, the user selects the job utilizing the UI 56 of the printing system 2 and follows the UI's instructions on scanning in the two hardcopy images. After the images of the two hardcopy documents are scanned, the user releases the job and the printing system 2 produces ten copies of the (now) twelve page job.

The disclosed method and device provide an efficient and flexible way of adding hardcopy images when printing an electronic document. While the application refers to merged documents wherein images of hardcopy documents are inserted in the desired location in electronic documents as finished documents, those skilled in the art will recognize that the term finished does not insinuate that the generated document is incapable of being modified. For instance, when the user selects to save the finished document to a file, such finished document may be further modified prior to printing or otherwise outputting the document.

Although the disclosed method and device for generating a finished document including an electronic document with images of scanned hardcopy documents inserted therein has been described in detail with reference to certain embodiments, variations and modifications exist within the scope and spirit of the present disclosure as described and defined in the following claims.

What is claimed is:

1. A method of generating a finished document with a printing system comprising:
   generating an electronic document;
   identifying a plurality of insertion positions in the electronic document for placement of scanned images of hardcopy documents;
   sending the electronic document with the identified insertion positions to a printing system that is coupled to a scanner;
   detecting identification of insertion positions in the electronic document from a header of the electronic document;
   holding the electronic document from being processed by the printing system in response to the detection of the insertion position identifications;
   selecting through a user interface of the printing system the electronic document for further processing by the printing system;
   displaying an indication for hardcopy scanning and the insertion position in the electronic document for a scanned image in response to the electronic document selection;
   scanning a hardcopy document with the scanner of the printing system to generate an image of the hardcopy document;
   inserting the image of the hardcopy document in the electronic document at the displayed insertion position;
   continuing to display an indication for hardcopy scanning and another insertion position in the electronic document for a scanned image, to scan a hardcopy document with the scanner to generate an image of the hardcopy document, and to insert the image of the scanned hardcopy document into the electronic document at the displayed insertion position until all of the insertion positions have been displayed and hardcopy document images have been inserted into the electronic document at all of the identified insertion positions;
   releasing the electronic document for processing by the printing system in response to hardcopy document images being inserted into the electronic document at all of the identified insertion positions; and
   printing with the printing system the electronic document with all of the hardcopy document images inserted into the electronic document at all of the identified insertion positions.

2. The method of claim 1 further comprising:
   detecting correspondence between a user identification entered through the user interface and the electronic document selected through the user interface before the indications of hardcopy scanning and the insertion positions are displayed.

3. The method of claim 1 wherein the electronic document is generated on a computer remotely located from the printing system but coupled to the printing system.

4. The method of claim 1 further comprising:
   electrostatographically printing the electronic document with all of the hardcopy document images inserted into the electronic document at all of the identified insertion positions.

5. A document generation system comprising:
   a printing system including a print engine, a scanner, a controller and a user interface;
   a computer remotely located from but coupled to the printing system, the computer including software configured to generate an electronic document and to designate a plurality of insertion positions in a header of the electronic document to identify positions in the electronic document where scanned images of hardcopy documents are to be inserted prior to generating a finished document that includes the electronic document and the images of the scanned hardcopy documents; and
   the controller of the printing system includes software configured to detect identification of the insertion positions in the electronic document from the header of the electronic document and to hold the electronic document from being processed by the printing system in response to the detection of insertion position identification in the header until a user has scanned hardcopy documents for each insertion position in the electronic document in response to displays of indications for hardcopy document scanning and corresponding insertion positions at a display of the user interface and the user has activated a release of the electronic document for processing by the printing system.

6. The document generation system of claim 5 wherein the printing system electrostatographically prints the electronic document and the scanned images of hardcopy documents inserted into the electronic document in response to the release of the electronic document.

* * * * *